United States Patent [19]
Nally et al.

[11] Patent Number: 6,073,158
[45] Date of Patent: Jun. 6, 2000

[54] SYSTEM AND METHOD FOR PROCESSING MULTIPLE RECEIVED SIGNAL SOURCES

[75] Inventors: Robert Marshall Nally, Plano; John Charles Schafer, Wylie, both of Tex.

[73] Assignee: Cirrus Logic, Inc., Fremont, Calif.

[21] Appl. No.: 08/099,083

[22] Filed: Jul. 29, 1993

[51] Int. Cl.[7] .................................................. G06F 13/00
[52] U.S. Cl. ........................ 709/102; 709/103; 710/6; 710/24; 345/56; 348/441; 348/668; 348/676; 348/721; 711/118; 711/151; 711/155; 712/3; 712/4; 712/8; 712/9
[58] Field of Search .............................. 345/56; 348/15, 348/19, 441, 668, 676, 721, 575, 576, 577, 584, 589, 600; 711/104, 117, 118, 147, 150, 151, 155, 207, 218; 709/102, 103; 710/6, 24; 712/3, 4, 8, 9

[56] References Cited

U.S. PATENT DOCUMENTS

| | | | |
|---|---|---|---|
| 4,569,026 | 2/1986 | Best ........................................ | 345/327 |
| 4,665,433 | 5/1987 | Hinson et al. .............................. | 358/22 |
| 4,737,921 | 4/1988 | Goldwasser et al. ..................... | 395/163 |
| 4,847,621 | 7/1989 | Colles ...................................... | 341/148 |
| 4,857,929 | 8/1989 | Katzenstein .............................. | 341/148 |
| 4,896,261 | 1/1990 | Nolan ....................................... | 395/287 |
| 4,899,151 | 2/1990 | Colles ...................................... | 341/145 |
| 4,904,922 | 2/1990 | Colles ...................................... | 323/316 |
| 4,949,280 | 8/1990 | Littlefield ................................. | 395/163 |
| 5,226,156 | 7/1993 | MacLean, Jr. et al. .................. | 395/600 |
| 5,227,863 | 7/1993 | Bilbrey et al. ............................ | 358/22 |
| 5,309,555 | 5/1994 | Akins et al. .............................. | 395/157 |
| 5,315,701 | 5/1994 | DiNicola et al. ......................... | 395/163 |
| 5,394,524 | 2/1995 | DiNicola et al. ......................... | 395/163 |
| 5,408,606 | 4/1995 | Eckart ...................................... | 395/163 |
| 5,440,683 | 8/1995 | Nally et al. ............................... | 395/162 |
| 5,485,559 | 1/1996 | Sakaibara et al. ........................ | 395/133 |

OTHER PUBLICATIONS

"Session XIV: Data Acquistion and Conversion, THPM 14.6: A 60 ns Glitch–Free NMOS DAC," V. Shen, D. Hodges, 1983 IEEE International Solid–State Circuits Conference, pp. 188–189.

"An 80–MHz 8–bit CMOS D/A Converter," T. Miki, Y. Nakamura, M. Nakaya, S. Asai, Y. Akasaka, Y. Horiba, IEEE Journal of Solid–State Circuits, vol. SC–21, No. 6, Dec. 1986, pp. 983–988.

CL–PX2070 Preliminary Data Sheet, Digital Video Processor, Oct. 1992, pp. 1–180.

CL–PX2080 Preliminary Data Sheet, MediaDAC, Dec. 1992, pp. 1–96.

*Primary Examiner*—Hiep T Nguyen
*Attorney, Agent, or Firm*—Fulbright & Jaworski L.L.P.; Steven A. Shaw

[57] ABSTRACT

A system and method for time slicing multiple received data streams utilizing multiple processors in such a manner as to ensure that all processors are running at full capability and are efficiently timesharing a global memory storage area. The received data streams are each divided into fixed portions called spans. The invention is operable for sequencing the movement of the time-sliced spans between the processors, adjusting the scheduling of particular ones of the time-sliced spans as a function of either processor availability or maintenance of real-time transmission of the received real-time time-sliced data streams.

63 Claims, 3 Drawing Sheets

SYSTEM AND METHOD FOR PROCESSING MULTIPLE RECEIVED SIGNAL SOURCES

TECHNICAL FIELD OF THE INVENTION

The present invention is directed in general to signal processing and, more specifically, to systems and methods for processing multiple received signal sources utilizing a single memory storage device.

CROSS-REFERENCE TO RELATED APPLICATIONS

The following copending and coassigned United States patent applications contain related material and are incorporated herein by reference:

U.S. patent application Ser. No. 08/029,716 entitled "System And Method For Displaying Multiple Data Screens To A Single Display Device," filed concurrently herewith;

U.S. patent application Ser. No. 08/098,844 entitled "Apparatus, Systems, And Methods For Displaying A Cursor On A Display Screen," filed concurrently herewith;

U.S. patent application Ser. No. 08/099,223 entitled "Method And System For Attaching Dynamic Control Codes To Received Real-Time Data Streams," filed concurrently herewith;

U.S. patent application Ser. No. 08/098,846 entitled "A System And Method For The Mixing Of Graphics And Video Signals," filed concurrently herewith;

U.S. patent application Ser. No. 08/099,194 entitled "Video Processing Apparatus, Systems And Methods," filed concurrently herewith;

U.S. patent application Ser. No. 08/099,835 entitled "Method And System For Achieving Full Monotonic Signal Conversion," filed concurrently herewith;

U.S. patent application Ser. No. 08/099,158 entitled "A Voltage Reference And Current Source For Video DAC," filed concurrently herewith; and U.S. patent application Ser. No. 08/098,840 entitled "Method and System for Generating Dynamic Zoom Codes," filed concurrently herewith.

BACKGROUND OF THE INVENTION

Perhaps the most exciting, and most useful, area of electronics today involves the gathering and manipulation of multiple real-time data signals. A real-time signal is any signal whose transmission between two particular points cannot tolerate interruption.

A real-time system therefore, as a result of processing real-time data signals, has well-defined and fixed time constraints which require the completion of process tasks within the defined time constraints or they suffer system failure.

Examples of real-time systems included dedicated applications, such as, weather tracking and teleconferencing systems, control systems developed for manufacturing environments, computer systems designed to supervise scientific and medical experiments, and advanced television technology.

As an example, consider a video teleconferencing paradigm involving four remote sites. A user, seated at a desk peers into a computer, and sees, besides the user's own image, which ensures that the camera projecting that image is correctly positioned, the other three participants at their respective sites. All four data streams appear within an associated display window, and each of the windows is full motion, i.e., real-time.

Thus, besides the user's locally projected image, there are three additional real-time video sources simultaneously received from the other sites. Thus, all windows are simultaneously active.

Traditionally, a system implemented to meet the needs presented by this paradigm would utilize four individual video controllers, each overseeing the contents of one of the four display windows. Each video controller would be comprised of a processing unit coupled with an associated memory storage device. Thus, there would be a one-to-one correlation between video controllers and received video data streams.

Each of the video controllers would drive a stream of output data to a multiplexer which was coupled between the multiple video controllers and the display mechanism. The multiplexer would transition among the four video controllers creating the desired output display. A necessary requirement of this approach being that all of the received data sources being genlocked together. In essence, the multiplexer would select between the multiple received data sources by turning a first data stream "on," turning a first data stream "off," and turning a second data stream "on," turning a second data stream "off," and turning a third data stream "on," etc.

The failings inherent to the above approach are twofold. First, this approach provides a very fragmented solution to the management of multiple received data streams, and second, this approach, which utilizes a separate microprocessor and a separate storage buffer for each received data stream, is inordinately expensive, and thus undesirable for common use.

Accordingly, there exists a need in the art for a system and method for simultaneously processing multiple received signal sources utilizing a single memory storage device.

There exists a still further need in the art for a system and method for processing multiple received signal sources which may be implemented within a single easily replaceable integrated circuit.

There exists a still further need in the art for a system and method for processing multiple received signal sources which is cost effective and reliable.

There exists a still further need in the art for a system and method for processing multiple received signal sources whose implementation is presented as an integrated whole, built top-down to fit into a consistent, coherent conceptual frame work.

SUMMARY OF THE INVENTION

These and other needs and features are achieved by the present invention which enables the processing of multiple received data sources utilizing a single memory storage device, wherein at least one of the received data sources is intolerant to transmission disruption.

In the preferred embodiment, the invention receives a plurality of data streams, two or more of which may be asynchronous with respect to one another. The invention associates each data stream to a data object which is stored within the memory storage device, which includes both memory controller and a frame buffer. The invention then time slices each one of the data objects into a plurality of unique data subsets called spans.

The invention then schedules the required movement of each of these spans among a plurality of processing units. The invention which is coupled with the processing units is operable to selectively alter the sequenced movement of particular spans as a function of either processor availability or maintenance of an uninterrupted transmission of a particular span's associated data stream.

In the preferred embodiment, the invention utilizes a buffering scheme wherein a number of spans may be queued to a particular processor simultaneously, thus ensuring that each processor is running at or near full capability. The invention is further capable of simultaneously processing multiple real-time data streams, wherein two or more of the data streams are asynchronous with respect to one another and further, each may be processed independently. The systems and methods taught by the invention are capable of transitioning among the various asynchronous data streams in a manner ensuring the uninterrupted transmission of each stream.

In the preferred embodiment, the invention includes a Data Flow Control Sequencer which is comprised of an instruction cache, a master sequence control register, and a span sequencer control unit.

The Data Flow Control Sequencer includes means for loading the instruction cache with a plurality of instructions, each instruction operable for moving a particular span from a current first processor to a desired second processor. In the preferred embodiment, each of these instructions may be linked with other associated instructions forming logical blocks.

The master sequence control register is capable of maintaining a unique pointer to each one of the linked associated instruction lists.

The span sequencer control unit is operable (1) to switch links associated with particular spans of particular linked associated instruction lists as a function of a particular span's desired processor's availability, and (2) to control the exchanging of a first unique pointer with a second unique pointer within the master sequencer control register as a function of the maintenance of the uninterrupted transmission of the received data streams.

Accordingly, one technical advantage is that a plurality of received real-time data streams may be simultaneously processed, regardless of whether these streams are interlaced, or asynchronous with respect to one another.

A further technical advantage is that the received data streams are partitioned into spans which are stored in a single memory storage device as complete and disconnected data objects.

A still further technical advantage of the present invention is that the design utilizes a link instruction list memory management approach which facilities a modular design which may be implemented within a single integrated device, which may be produced in mass quantities at a very low cost and is fast, dense and reliable.

A still further technical advantage is that this memory management approach enables the transitioning among various scheduled spans of data for processing as a function of maintaining the real-time transmission of each span's associated data stream.

A still further technical advantage of the present invention is that the design is expandable to support any desired number of simultaneously received real-time data streams.

A still further technical advantage is that the expansion of the design of the present invention does not impact the performance or precision of the implementation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2a illustrates a linked list;

FIG. 2b illustrates a repositioning of nodes within the linked list of FIG. 2a;

FIG. 2c illustrates a linked list equivalent to the linked list illustrated in FIG. 2b;

FIG. 2d illustrates an insertion of an additional node into the linked list illustrated in FIG. 2c;

FIG. 2e illustrates a linked list equivalent to the linked list illustrated in FIG. 2d; and FIG. 2f illustrates a deletion of an existing node from the linked list illustrated in FIG. 2e;

DETAILED DESCRIPTION OF THE INVENTION

Figure 1:
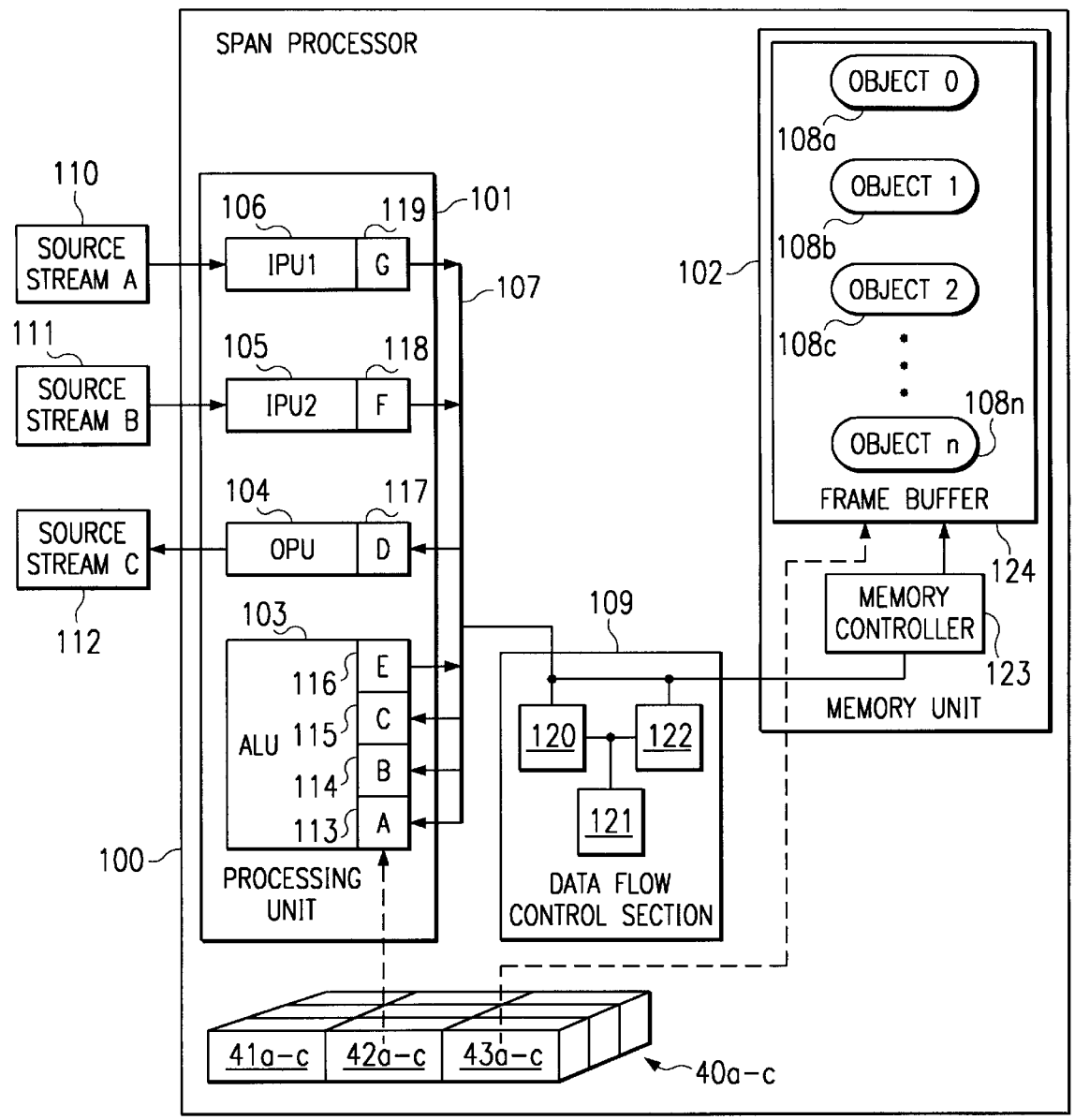
FIG. 1 illustrates a block diagram of a Span Processor incorporating the concepts of the invention.

As previously discussed, the invention teaches both systems and methods for processing multiple data signals utilizing a common memory storage device, such as a frame buffer, Video Random Access Memory ("VRAM"), Dynamic Random Access Memory ("DRAM") or any other dynamic storage device. Recall further, that the implementation of the invention uses a combination of computer hardware and software to provide a memory management scheme which facilitates simultaneous processing of multiple real-time data signals.

For the purposes of providing a clear and comprehensible discussion of the present invention, the preferred embodiment will be presented in a real-time video processing environment.

Prior to undertaking the detailed description of the present invention, it would be advantageous to briefly discuss the attributes of a real-time video signal processing. Both computer graphics and video, demand display devices whose images may be changed very quickly. Non-permanent image displays allow an image to be changed, making possible movement of portions of an image.

The cathode ray tube ("CRT") is by far the most common display device. However, solid state technologies are being developed which may, in the long term, have substantial impact on the dominance of the CRT. Thus, although one embodiment of the invention involves use of a CRT, it should not be construed as being limited to that environment.

In fact, the approach taught by the present invention wherein received data streams are time-sliced into spans and subsequently processed is adaptable to any system requiring the simultaneous processing of multiple data streams wherein at least one of the streams requires the maintenance of an uninterrupted transmission.

In the mid-70s a form of display known as raster graphics was developed based on then current television technology. In raster displays, the display primitives such as lines (or rasters), characters and solid areas (typically polygons) are stored in a refresh buffer in terms of their component points, called pixels (short for "picture elements"). Each raster is comprised of a series of spans, and each span is in turn comprised of a group of pixels. Display images are formed from a combination of rasters.

A span is therefore an arbitrary quantity of pixels within a scan line, wherein each span is typically comprised of eight to sixteen pixels. Thus, the raster display is simply a matrix of pixels covering the entire screen area. The entire image is scanned out sequentially, one raster line at a time, top to bottom, by varying only the intensity of the electron beam for each pixel on the line. The storage needed is thus greatly increased in that the entire image (typically, 512 lines by 512 pixels) must be stored explicitly in a bit map containing all points that map 1-to-1 to points on the screen.

In the preferred embodiment, the invention solves the problems inherent to the processing of multiple real-time data streams through the utilization of a span processor. The span processor receives a plurality of data streams, two or more of which may be asynchronous to one another (which in video may involve interlaced or deinterlaced video or graphics streams). The span processor then time slices each received data stream, treating each slice as a separate span. Once the signal has been segmented into separate elements, the invention, which in the preferred embodiment is imbedded within the processing unit, is capable of sequencing the plurality of data objects such that the required processing for all real-time data streams is completed without creating a delay, or disruption, in the transmitted real-time signal. In essence, this is completed by alternating among the various time slices, or spans, in a cyclic manner.

The quintessence of the present invention is a memory management scheme which enables the sequencing of the above referenced spans such that multiple real-time data streams are capable of being processed simultaneously while maintaining their uninterrupted transmission.

Accordingly, prior to undertaking any further discussion of the embodiment of the invention, it would be advantageous to discuss a fundamental data structure, the linked list, utilized by the invention.

A linked list is a set of data flow control units organized sequentially. In a linked list, an explicit arrangement is used in which each data flow control unit, or node, is comprised of a data element, which is a span in the preferred embodiment, and a "link" to the next node. The link is thus an address, or offset pointer, to the next node within the linked list.

Figures 2A, 2B, 2C, 2D, 2E, 2F:
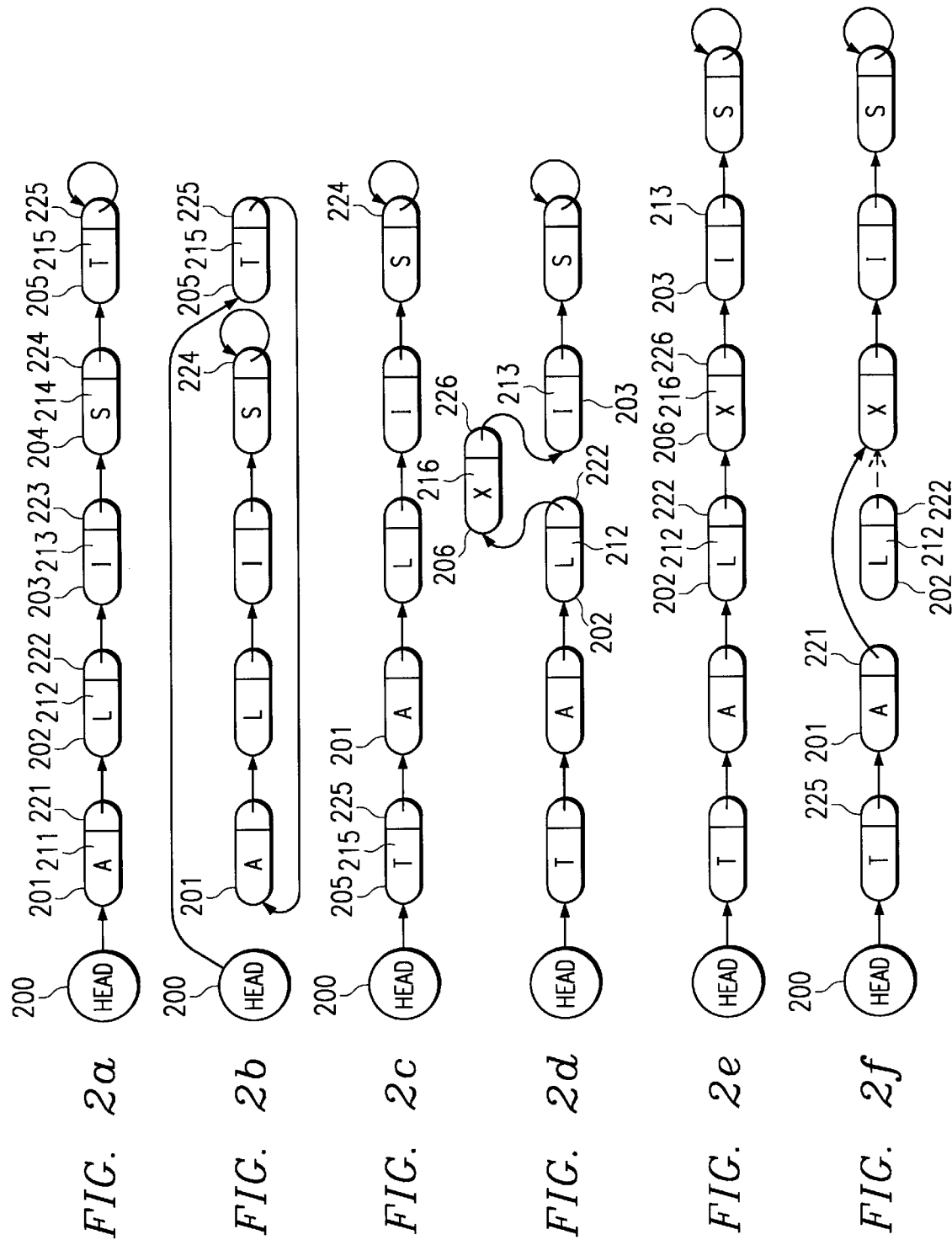

Turning to FIG. 2a, there is illustrated a linked list, with data element 211-215 represented by letters "A", "L", "I", "S", and "T", respectively; nodes represented by ovals 201–205; and links represented by narrowed lines protruding from preceding nodes 221–225, and connecting them with succeeding nodes.

The simple representation of the linked list of FIG. 2a highlights two details, first, every node 201–205 has a link 221–225, so that the last node 205 in the list must specify some "next" node 201–205. The illustrated convention will be to have the last node's link 225 point to its own node 205. Second, there will be a "head" 200, which will point to a first node 201 in the linked list. The main purpose of head 200 is to provide a means for accessing a particular linked list, thus making manipulations among associated nodes 201–205 and links 221–225 possible.

The linked list implementation of ordering nodes, and transitioning among "linked" nodes, via address offsets 221–225, enables certain operations to be performed much more efficiently than would be possible with other data structures.

For example, turning now to FIG. 2b, suppose it was desirable to move the last node 205 maintaining the data element labeled "T" 215 from the end of the list to the beginning of the list. In a linked list, there is a simple adjustment of three pointers, namely, head 200 and links 224 and 225, as is shown in FIG. 2b. Former last node 205 will point to the former first node 201, former second to last node 204, the new last node, will point to itself node 204, and lastly, head 200 will point to node 205, the new first node.

Turning to FIG. 2c, there is illustrated a linked list equivalent to the linked list illustrated in FIG. 2b. Again, node 205 is the first node of the linked list. Accesses to this list are still accomplished through head 200. Accordingly, former first node 201 can only be accessed by utilizing link 225 of node 205.

Note that even if this linked list were very long, the structural change depicted in FIGS. 2a–2c would still be completed simply by changing three links 221–225. In contrast, the means for carrying out this same manipulation in other data structures, such as arrays or trees, could require movement of every element within the particular data structure in order to create room for the new data item at the beginning of the structure.

Turning now to FIGS. 2d and 2e, there is illustrated a linked list wherein an additional node 206, containing data element "X" 216, is being "inserted" into the existing linked list between node 202 and node 203.

Data element 216 is inserted into the current linked list by allocating a new node 206, moving data element 216 into it, pointing node 206's associated link 226 at node 203, which contains data element "I" 213, and then altering link 222 associated with node 202 containing data element "L" 222 to point to new node 206.

Note, that an insertion causes a linked list to grow in length by one node 206, illustrating the flexibility inherent to this data structure. In a linked list, an insertion therefore requires only two links 222, 226 to be changed, regardless of the list's length. In contrast, an insertion is generally both unnatural to, and inconvenient for, other data structures. Again note, similar to the equivalence of FIGS. 2b and 2c, FIGS. 2d and 2e are the same.

Turning now to FIG. 2f, there is illustrated a linked list wherein an existing node 202, containing data element "L" 212, is being "deleted" from the current linked list. Node 202 is deleted simply by making node 201's link 221, which is currently pointing to node 202, point to node 206, thus skipping over node 202. Note that node 202 still exists, and in fact, its link 222 still points to node 206, notwithstanding, node 202 is no longer part of the current linked list. Thus, node 202 can no longer be accessed by following head 200 and associated preceding links 225, 221 to access node 202. Note, that a linked list, through a deletion, shrinks by one in length, and requires the simple manipulation of a single link 222. In contrast, a deletion in another data structure could require the movement of most or all of the data elements succeeding the data element to be deleted.

Therefore, the primary advantage of linked lists over other data structures is that they can grow and shrink in size over their lifetime. In particular, their maximum size need not be known in advance, which in practical applications often makes it possible, and in the present invention necessary, as will be described, to have several data structures share the same common memory space without paying particular attention to their relative sizes.

A second advantage of a linked list over other data structures is that they provide flexibility in allowing the items to be rearranged efficiently. This flexibility is gained at the expense of quick access to any arbitrary item in the list as searches can only be accomplished sequentially. However, where arbitrary access to a particular data element is not necessary to the effectiveness of the application utilizing the linked list, which is the case with the present invention, there is no cost for this flexibility. This will become more apparent after we have examined some of the basic properties of the present invention and some of the fundamental operations which we will perform upon spans, or data elements, utilized by the present invention.

Recall, that the nodes 201–206 are each comprised of a single data element 211–216 and a single link 221–226. In practice, a node within a linked list may have several links and/or data elements associated with it.

Figure 3:
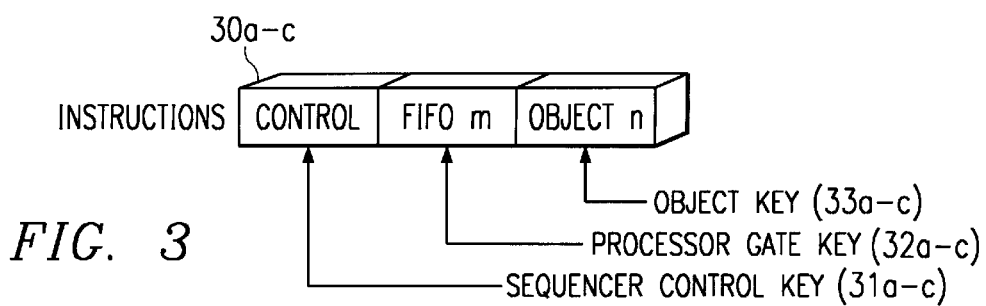
FIG. 3 (shown in conjunction with FIG. 1) illustrates a linked list node of the kind utilized in the preferred embodiment of the present invention.

Turning now to FIG. 3 (shown in association with FIG. 1), there is illustrated a linked list node 30*a–c* of the kind utilized by the present invention. In the preferred embodiment, each linked list node 30*a–c* is comprised of three data fields, a Sequencer Control Key ("Control") 31*a–c*, a Processor Gate Key ("FIFO m") 32*a–c* and an Object Key ("Object n") 33*a–c* (wherein "m" and "n" correspond to an unknown number of FIFOs and Objects, respectively).

Recall, the problem to which the present invention is directed is the situation in which multiple received and/or transmitted data streams are competing for a single port or device wherein one or more of the data streams requires an uninterrupted transmission. With that in mind, it is important to note at this point in our discussion, that in the preferred embodiment each node 30*a–c* is representative of a single instruction, each of which is responsible for the movement of one span of data from a first location of that span to a desired second location.

For example, a first span may be present at an input gate and it may be desirable to move that span to a local memory storage area, or a second span may have completed processing at some dedicated processing unit and must then move to an output gate. Each of these moves, from the input processor to memory, or from the processing unit to an output gate, requires a separate instruction, which within the preferred embodiment is represented by a node 30*a–c*. Thus, the system is responsible for sequencing movement of each of these spans of data, or instructions, among the various processing units.

Turning to the individual elements which comprise node 30*a–c*, Control 31*a–c* is a link pointer, or address offset, which points to a "next" instruction. Thus, Control 31*a–c* performs the same function as that performed by each of the links 221–226 of FIG. 2.

Note, that in contrast to the linked list introduced in connection with the detailed description of FIG. 2, each linked list utilized in the preferred embodiment is circularly linked, i.e., the link of the last node in the linked instruction list points to the first node in the list.

Figure 4:
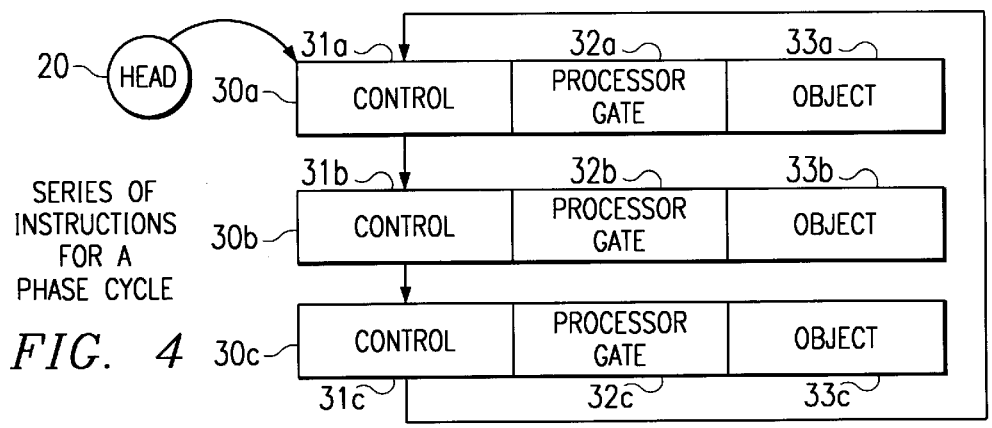
FIG. 4 illustrates a circularly linked list of the kind utilized in the preferred embodiment of the present invention.

Turning now to FIG. 4, there is illustrated a circularly linked list of the kind utilized by the present invention. Observe that Control 31*a* of a first linked list node 30*a* points to a second linked list node 30*b*, Control 31*b* of second linked list node 30*b* points to a third linked list node 30*c*, and so on. If a current linked list node 30*a–c* is the last, or final, node 30*a–c* within the linked instruction list, its associated Control 31*a–c* will point to the first node within the circularly linked loop, node 30*a*. Node 30*c* is currently the last node 30*a–c* in the linked instruction list. Node 30*c*'s associated Control 31*c* therefore points to node 30*a*. By comparison, if the present linked list node 30*a* is the only node 31*a–c* within a particular linked instruction list, its associated Control 30*a* will point to itself, node 30*a*.

It should be emphasized, that although the invention utilizes a circular linked list in most all of its operations, a non-circular linked list implementation is possible and within the scope of this disclosure.

Returning now to FIG. 3, FIFO 32*a–c* is the "key" to a particular processor gate for this instruction. Recall, that in the preferred embodiment, the present invention is comprised of a processing unit coupled with a single memory storage device, both of which will be discussed in greater detail in connection with the detailed description of FIG. 1. The processing unit is comprised of four dedicated processors to which FIFO 32*a–c* guides the delivery of node 30*a–c*'s associated span.

Object 33*a–c* is a second link pointer, or span identifier, and points to the particular span addressing controls within the local memory storage device which, when FIFO 32*a–c* opens a particular processor gate, provides the memory address of its associated span. This span is accessed, the data in memory associated with this data object is transferred to the desired processor for processing, which may include input/output processing, logical operations, scaling, etc.

Turning now to FIG. 1, there is illustrated a block diagram of a Span Processor. In the preferred embodiment, Span Processor 100 is comprised of a Processing Unit 101, a Data Flow Control Section ("DFCS") 109, and a single memory storage device, Memory Unit 102. Processing Unit 101, DFCS 109 and Memory Unit 102 are each coupled to a bidirectional data bus 107. Data bus 107 facilitates the transfer of spans of data, among Processing Unit 101, and Memory Unit 102. For a more complete description of the operation of the video processing circuitry, reference is now made to "CL-PX2070 Preliminary Data Sheet CL-PX2070 Digital Video Processor," October, 1992, and "CL-PX2080 Preliminary Data Sheet CL-PX2080 MediaDAC," December, 1992, both available from Census Logic, Inc, Fremont, Calif. such data sheets being incorporated herein by reference.

Processing Unit 101 is comprised of four dedicated processors, specifically, an Arithmetic Logic Unit ("ALU") 103, an Output Processing Unit ("OPU") 104, and two Input Processing Units ("IPU1" and "IPU2," respectively) 105, 106.

Note that multiple received and transmitted data Source Streams A–C 110–112 are entering and leaving Span Processor 100 simultaneously. Source Stream A 110 is received through IPU1 106. Source Stream B 111 is received through IPU2 105. Source Streams A and B 110, 111 are received from a host system (not shown) which selectively determines which of the streams goes to which of the processing units. Further, although Source Streams A and B 110, 111 are shown, the invention is capable of receiving Source Streams D and E (not shown) which are asynchronous with Source Streams A and B 110, 111. The ability of the invention to logically and efficiently process multiple asynchronous data streams enables the system to phase process multiple received data streams.

Lastly, Source Stream C 112, being outbound, is transmitted by OPU 104 to the above referenced host system.

Each processing unit 103–106 is equipped with one or more first-in, first-out temporary storage queues, FIFOs A–G 113–119. Each of the FIFOs 113–119 is operable for buffering one or more spans of data. In the preferred embodiment, the depth of the buffering is determined by an analysis of the rates of the incoming data streams and the available bandwidth on the memory bus 107.

In the preferred embodiment, ALU 103 is designed to perform operand selection, data tagging, logical operations, arithmetic operations and output selection. ALU 103 operates upon a received data span logically or arithmetically, or replaces the span or one of its component values with a constant. It can decode and/or encode pixel tags. In the preferred embodiment, ALU 103 processes two simultaneous input video streams through FIFOs A 113 and B 114, and mask or mixing controls through FIFO C 115. Processed streams of data are output through FIFO E 116.

OPU 104 has a four-span deep FIFO gate, FIFO D 117, and provides both data signal conversion and zooming capabilities.

IPU1 106 is a fully functional continuous scaler which performs data format conversion, color space conversion, data tagging for particular methods of graphics/video mixing, and window clipping, among other functions. IPU2 105, by contrast, is a limited half-scaler which provides window clipping among other functions. Both IPU1 106 and IPU2 105 have associated FIFOs G and F 119, 118.

Note that the above referenced host system has knowledge regarding the distinct capabilities of the various dedicated processors 103–106, and in particular, the host system utilizes this knowledge to determine which of its received data streams should be driven to which particular input processing unit 105, 106. This decision is generally dictated by the asynchronous nature of two or more of the received data streams.

Memory Unit 102 is comprised of a memory controller 123 [113] and a frame buffer 124 [114]. Memory controller 123 [113] is a dedicated processor used for supervising the movement of data spans to and from frame buffer 124 [114]. Frame buffer 124 [114] is comprised of "n" data objects 108a–108n. Each data object 108a–108n is representative of a variable size memory storage area in which a particular data stream is stored. In the preferred embodiment, each data object 108a–n is comprised of a plurality of data spans of video or graphics data, two or more of which may be asynchronous to one another. Further, if the stored data is graphics data, it may be interactive.

DFCS 109 consists of a 32-bit instruction cache 122, a master sequencer control register 121, and a span sequencer control unit 120. In the preferred embodiment, span sequencer control unit 120 administers control over two pointers held within master sequencer control register 121, and through these two pointers, is capable of maintaining two linked instruction lists simultaneously within instruction cache 122.

In the preferred embodiment, master sequencer control register 121 provides a means by which the memory mapping scheme employed by the present invention is carried out. As previously introduced, master sequence control register 121 maintains an initial pointer into each of the linked instruction loops. Recall from our discussion of FIG. 2, that a unique head 200 is required to access particular ones of multiple linked instruction lists.

The maintenance of multiple pointers, or heads 200, enables the system to (1) phase process multiple received, and possibly, asynchronous data streams; (2) time-slice these multiple received data streams into spans of data; and (3) span process the time sliced data in an effective and efficient manner. Recall that received streams of video/ graphics data may enter and exit the system through alternating even and odd fields, i.e., the streams are asynchronous with respect to one another. Thus, by maintaining separate pointers to each sequencing loop, the invention is capable of performing a number of operations upon the spans associated with a first of data object during an even field time and performing a number of operations upon the spans associated with a second data object during an odd field time. The invention is further capable of processing the spans associated with a particular data stream in its particular field time such that spans which are presently being processed are not the same spans receiving data from an incoming data stream.

Note, the hardware implementation of the invention facilitates execution rates of linked instruction loops 30a–c significantly faster than the stream rates of typical real-time data. Accordingly, the instructions are conditional, i.e., at any given time, the particular FIFO A–G 113–119 associated with a current instruction may or may not be ready to transmit or receive data. If such is the case, DFCS 109 skips the current instruction, i.e., following this instruction's 30a–c Control 31a–c, or link, to the next sequenced instruction 30a–c. This "forward chaining" is continued until an instruction is found which is ready to be executed. Thus, once multiple spans of data have been scheduled, the invention is operable to selectively alter the sequenced movement of particular spans, or instructions, based either on processor availability or the maintenance of an uninterrupted transmission of a data stream associated with a particular span or its parent data object, or group of spans and associated data objects.

Recall, that the preferred embodiment employs a circularly linked instruction list 30a–c, thus, a skipped instruction 30a–c is passed over, but is eventually executed as span sequencer control unit 120 forward chains through the linked instruction list 30a–c.

The use of the various manipulation methods, discussed in connection with the detailed description of FIG. 2, allow for a vast number of processing system designs as DFCS 109 is operable, through this linked list implementation, to "flip" from one circularly linked loop to another, within a single instruction by simply exchanging address offsets or pointers. The invention consequently provides a means of transitioning among several linked instruction loops and preforming various operations upon their associated data objects through the processing of each object's associated spans without disrupting any particular data streams transmission, and thus enabling the complete processing of all spans associated with a particular received data stream.

In essence, DFCS 109 is a special purpose microcontroller, which in the preferred embodiment is capable of moving pixel data among the hardware resources, namely, processing unit 101 and memory unit 102. In operation, DFCS 109 resembles a short processing loop made of conditional instructions, i.e., linked instruction lists 30a–c of FIG. 3. Each instruction 30a–c causing data to move between the various hardware components, i.e., memory unit 102, ALU 103, OPU 104, IPU1 106, and IPU2 105. Each instruction 30a–c is therefore responsible for four functional actions, or steps, in the movement of a single data object, namely, (1) specifying the source of the information; (2) conditioning the data object for execution; (3) identifying the destination of the information; and (4) providing the offset, or data address, of the next instruction set. The possible sources and destinations of the information are memory unit 102 or FIFOs A–G 113–119 of dedicated processors 103–106.

These and similar transactions are governed by DFCS 109 which controls both the flow and the transfer of data between processing unit 101 and memory unit 102, and among dedicated processors 103–106. Within DFCS 109 are a series, or sequence, of move instructions 30a–c which were introduced in connection with the detailed description of FIG. 3. Recall, as previously discussed, that a series of move instructions 30a–c are linked together in a list. Each linked list is a sequence of span transfers, wherein each circularly linked list manages the transfer of data from one processor to another.

Recall that each instruction, which is referred to as a Data Flow Unit ("DFU") in the preferred embodiment, is comprised of three fields, Control 31a–c, FIFO m 32a–c and Object 33a–c. Each instruction's 30a–c Control 31a–c provides an index which, following the execution of its associated instruction, points to the next span instruction 30a–c. A phase cycle may expand or recede as is necessary to meet the processing requirements of a particular phase cycle.

Further recall that when an instruction 30a–c is addressed, DFCS 109 determines whether the desired spans of data associated with a particular data object is available. Next, DFCS 109 determines whether the desired processing gate is available. If either is not available, DFCS 109 proceeds to the next instruction, and in so doing, DFCS 109 optimizes the amount of time spent waiting for a particular processor or span to become available.

DFCS 109 is also operable to pre-fetch subsequent instructions. Thus, while DFCS 109 is directing a span transfer for a first instruction, DFCS 109 is operable to fetch a second instruction, checking the availability of its span and desired processor gate, deciding in advance whether the second instruction may be executed. If the second instruction is not available, DFCS 109 pre-fetches a third instruction, and so on. Thus, by the time the first instruction completes processing, DFCS 109 has had a number of chances to fetch and check the status of subsequent instructions. Instruction fetch time is accordingly optimized, since as soon as DFCS 109 completes processing of the first instruction, it immediately enters a next instruction execution cycle.

Figure 5:
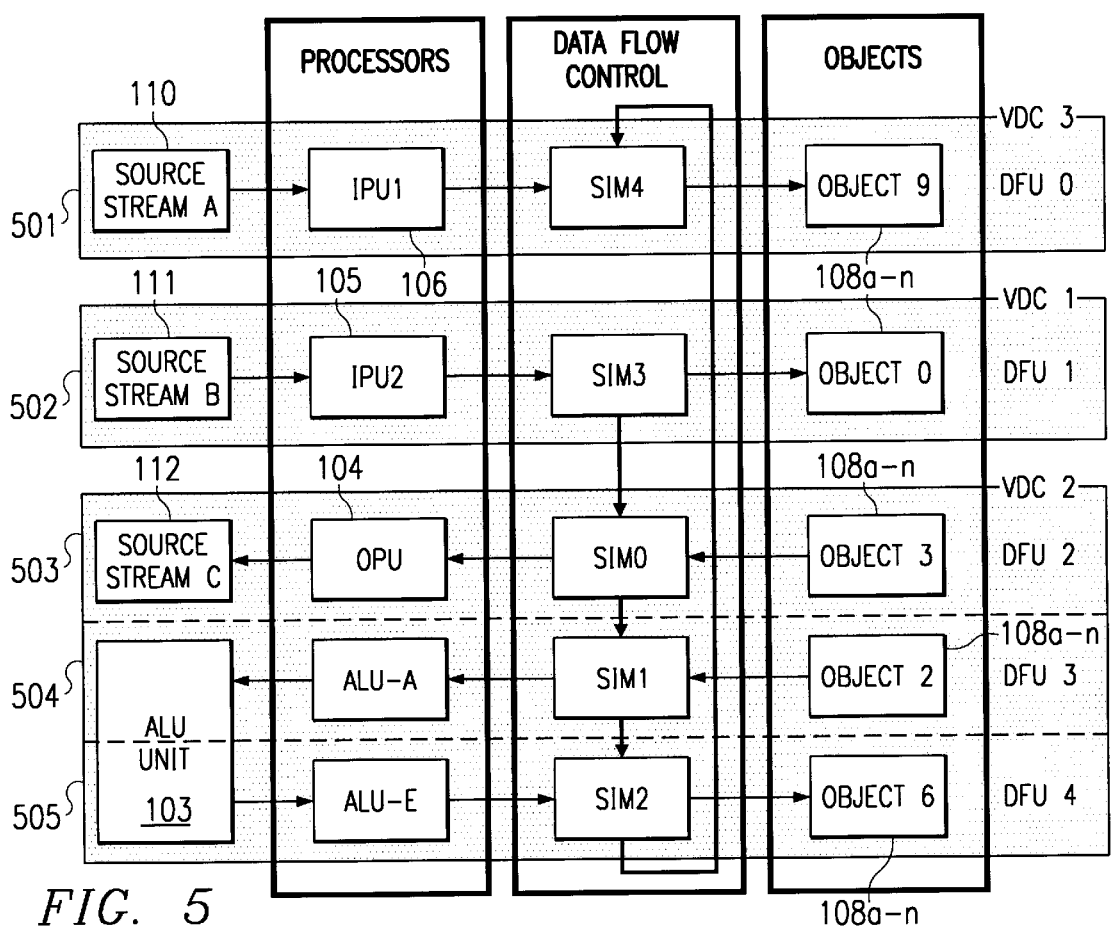
FIG. 5 illustrates an example of the sequencing of five individual instructions within the processing unit implemented within FIG. 1.

Turning now to FIG. 5, there is illustrated an example of the sequencing of five individual instructions within processing unit 101. In the preferred embodiment each instruction is referred to as a Data Flow Unit ("DFU").

Each DFU is responsible for identifying all the resources required to establish a flow of data from one point in the system to another. As a first example, note that a DFU 0 501 is responsible for receiving a first span of data from Source Stream A 110 through IPU1 106 and storing the received span of data within a portion of a data object within memory storage device 102 of FIG. 1, Object 9 108a–n. DFU 1 502 is responsible for receiving a second span of data from Source Stream B 111 through IPU2 105 and also storing the received span of data within a portion of a data object, Object 0 108a–n. DFU 2 503 is responsible for transmitting a third span of data from its position in memory where it resides within a stored data object, Object 3 108a–n to OPU 104 where it is driven out of the system as Source Stream C 112. DFU 3 504 is responsible for transmitting a span of data from its position in memory, where it is stored within Object 2 108a–n, to FIFO A 113 of ALU 103 where the span of data is processed and then moved to FIFO E 116 of ALU 103. DFU 4 505 is responsible for receiving a data span from FIFO E 116 of ALU 103 and storing it within Object 6 108a–n.

Thus, FIG. 5 illustrates how five spans of real-time data may be simultaneously processed utilizing a single processing unit 101, comprised of four dedicated processors 103–106, in combination with a single memory storage device, Memory Unit 102. Important to recall, is that although two or more received data streams may be asynchronous to one another, once received and stored within data objects in memory, their spans may be synchronously processed, and even mixed together.

Figure 6:
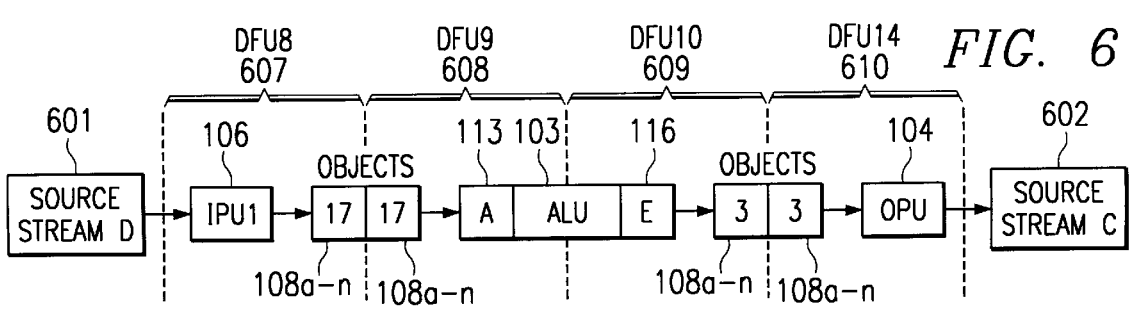
FIG. 6 illustrates an example of four instructions, or Data Flow Units ("DFU"), utilized in the reception, processing, and transmission of real-time data extended over a period of time.

Turning now to FIG. 6, there is illustrated an example of four DFUs utilized for the reception, processing, and transmission of a single span of real-time data extended over a period of time. It should be noted that this figure does not represent a single sequencing loop, but rather a three stage process where DFU 8 607 is a single DFU linked list and all the spans in DFU 8 607 are processed before moving to the next stage. The second stage is a two DFU loop (DFU 9 608 and DFU 10 609) where each DFU 608, 609 is processed span by span in turn until both DFUs are completely processed. The last phase is another single DFU 14 610 linked list and represents a one stage process where all the DFUs are in the same linked list.

DFU 8 607 is responsible for receiving a span of data from Source Stream D 601 through IPU1 106 and storing the received data as a span within a data object, Object 17 108a–n. DFU 9 608 is responsible for moving part of the data object from its position in memory, where it is stored within Object 17 108a–n, to FIFO A 113 of ALU 103 where it is processed and then moved to FIFO E 116 of ALU 103. DFU 10 609 is responsible for receiving the processed spans from FIFO E 116 of ALU 103 and storing them within Object 3 108a–n. Lastly, DFU 14 610 is responsible for transmitting the data from its position in memory where it resides within Object 3 108a–n to OPU 104 where it is driven out of the system as Source Stream E 602.

Thus, represented is an example of the method of the present invention wherein time slicing is used on a received real-time data stream on which three operations are performed within four instruction steps, all steps being accomplished in real-time without the loss of any data.

Thus, viewing FIGS. 5 and 6 together, it is evident that FIG. 5 illustrates the case wherein DFCS 109 of FIG. 1 has sequenced five instructions, or DFUs 501–505, to simultaneously move five linked span lists between Memory Unit 102 and processing unit 101 (specifically dedicated processors 103–106). While FIG. 6, for lack of a better term, illustrates a "Day in the Life of a Span of Real-time Data,"

wherein four sequenced DFUs 607–610 are shown to move received spans of data from an input gate to memory, from memory to an ALU, from the processor back into memory, and finally out from memory through an output gate. Accordingly, during actual operation of the present invention, each of the four sequential DFUs 607–610 of FIG. 6 would be processed in parallel with other DFUs, each of which may or may not be associated with the same received data stream, and may be associated with data streams which were asynchronous with one another when received.

As is evident from the foregoing, in the preferred embodiment, the present invention solves the problems inherent to the processing of multiple real-time data streams through the utilization of a span processing unit. The processing unit, in essence, time slices each received real-time data stream, treating each slice as a separate span of data. Once the signal has been segmented Into separate spans, the invention, which is imbedded within Span Processor 100 of FIG. 1, is capable sequencing the plurality of spans such that the required processing is completed without creating a delay, or disruption, in the transmitted real-time signal. In essence, this is accomplished by selectively transitioning among the various time slices, or spans.

Although the preferred embodiment of the present invention has been introduced within video/graphics processing environment, the processed data streams need not be limited to video and graphics. The standard taught by the present invention may easily be implemented within the television environment, computer networking, telecommunications, or any other environment which requires that a signal, which is transmitted between two points, maintain an uninterrupted transmission.

Therefore, although the present invention and its advantages have been described in detail, it should be understood that various changes, substitutions and alterations can be made herein without departing from the spirit and scope of the invention as defined by the appended claims.

What is claimed is:

1. A system for processing a plurality of data streams, wherein each of said data streams is partitioned into a plurality of spans, said system comprising:
    a plurality of processing units, wherein at least one of said processing units is a memory controller and wherein said memory controller is coupled to a memory storage device, said memory controller including means for controlling transmission of ones of said spans among said memory storage device and ones of said processing units, at least one of said processing units comprising a video signal processor that modifies video data spans; and
    a sequencing circuit coupled to said processing units, said sequencing circuit responsible for scheduling movement of ones of said spans among said processing units, said sequencing circuit operable to selectively alter a scheduled movement of particular ones of said spans as a function of either processor availability during operation of said system or maintenance of uninterrupted movement of said data streams; and
    wherein two or more of said data streams are asynchronous with respect to one another.

2. The system as set forth in claim 1 wherein at least one of said data streams is real-time.

3. A system for processing a plurality of data streams, wherein each of said data streams is partitioned into a plurality of spans, said system comprising:
    a plurality of processing units, wherein at least one of said processing units is a memory controller and wherein said memory controller is coupled to a memory storage device, said memory controller including means for controlling transmission of ones of said spans among said memory storage device and ones of said processing units, at least one of said processing units comprising a processor for modifying graphics data spans; and
    a sequencing circuit coupled to said processing units, said sequencing circuit responsible for scheduling movement of ones of said spans among said processing units, said sequencing circuit operable to selectively alter a scheduled movement of particular ones of said spans as a function of either processor availability during operation of said system or maintenance of uninterrupted movement of said data streams; and
    wherein two or more of said data streams are asynchronous with respect to one another.

4. The system as set forth in claim 1 wherein said memory storage device is a VRAM.

5. The system as set forth in claim 1 wherein one of said processing units is an input processing unit, said input processing unit operable for receiving ones of said data streams.

6. The system as set forth in claim 5 wherein said input processing unit includes a first FIFO, said first FIFO operable for temporarily storing a plurality of sequentially time-sliced spans of data associated with various received data streams.

7. A system for processing a plurality of data streams, wherein each of said data streams is partitioned into a plurality of spans, said system comprising:
    a plurality of processing units; wherein one of said processing units is an ALU, said ALU including:
        means for receiving one of said spans;
        means for processing said received span, wherein said processing means includes:
            means for performing logical operations on said received span; and
            means for executing arithmetic operations on said received span; and
        means for transferring said processed span; and
    a sequencing circuit coupled to said processing units, said sequencing circuit responsible for scheduling movement of ones of said spans among said processing units, said sequencing circuit operable to selectively alter a scheduled movement of particular ones of said spans as a function of either processor availability during operation of said system or maintenance of uninterrupted movement of said data streams.

8. The system as set forth in claim 7 wherein said receiving means includes a second FIFO, said second FIFO operable for temporarily storing a plurality of sequentially received spans.

9. The system as set forth in claim 7 wherein said transferring means includes a third FIFO, said third FIFO operable for temporarily storing a plurality of sequentially processed spans.

10. The system as set forth in claim 1 wherein one of said processing units is an output processing unit, said output processing unit operable for driving ones of said spans.

11. The system as set forth in claim 10 wherein said output processing unit includes a fourth FIFO, said fourth FIFO operable for temporarily storing a plurality of sequentially received spans.

12. The system as set forth in claim 1 or 7 wherein said system is implemented within a television.

13. The system as set forth in claim 1 or 7 wherein said system is implemented within a communications network.

14. The system of claim 1 wherein a first video signal processor performs a first video processing function and a second video signal processor performs a second video processing function.

15. The system of claim 14 wherein said first and second video processing functions are selected from the group consisting of:
   data format conversion;
   color space conversion;
   data tagging;
   graphics mixing;
   video mixing;
   video scaling; and
   window clipping.

16. A control circuit coupled with a plurality of processing units for controlling movement of a plurality of data spans among said processing units, each data span representative of a segment of one of a plurality of data streams, wherein at least one of said data streams must maintain an uninterrupted transmission, said circuit comprising:
   means for sequencing movement of ones of said data spans between said processing units, wherein one of said processing units is a memory controller and wherein said memory controller is coupled to a memory storage device, said memory controller including means for controlling transmission of ones of said data spans among said memory storage device and ones of said processing units; and
   means for selectively altering a sequenced movement of particular ones of said data spans as a function of either processor availability during operation of said control circuit or completion of all required processing of said data spans by said processing units without creating a delay in a particular associated data stream;
   wherein two or more of said data streams are asynchronous with respect to one another.

17. The circuit as set forth in claim 16 wherein said uninterrupted transmission data stream is real-time.

18. The circuit as set forth in claim 16 wherein said processing units further comprise a processor for processing a video data stream, a processor for processing a graphics data stream, and an ALU for performing logical operations on said received spans and for executing arithmetic operations on said received spans.

19. The circuit as set forth in claim 16 wherein said memory storage device is a DRAM.

20. The circuit as set forth in claim 16 wherein one of said processing units is an input processing unit, said input processing unit operable for receiving ones of said data streams.

21. The circuit as set forth in claim 20 wherein said input processing unit includes a first FIFO, said first FIFO operable for temporarily storing a plurality of sequentially time-sliced data spans, each data span associated with a particular received data stream.

22. The circuit as set forth in claim 16 wherein one of said processing units is an output processing unit, said output processing unit operable for driving ones of said data spans.

23. The circuit as set forth in claim 22 wherein said output processing unit includes a fourth FIFO, said fourth FIFO operable for temporarily storing a plurality of sequentially received data spans.

24. A control circuit coupled with a plurality of processing units for controlling movement of data spans among said processing units, each data span representative of a segment of one of a plurality of data streams, wherein at least one of said data streams must maintain an uninterrupted transmission, said circuit comprising:
   means for sequencing movement of ones of said data spans between said processing units, wherein one of said processing units is an ALU, said ALU including:
      means for receiving one of said data spans;
      means for processing said received data span, wherein said processing means includes:
         means for performing logical operations on said received data span; and
         means for executing arithmetic operations on said received data span; and
      means for transferring said processed data; and
   means for selectively altering a sequenced movement of particular ones of said data spans as a function of either processor availability during operation of said control circuit or completion of all required processing of said data spans by said processing units without creating a delay in a particular associated data stream.

25. The circuit as set forth in claim 24 wherein said receiving means includes a second FIFO, said second FIFO operable for temporarily storing a plurality of sequentially received data spans.

26. The circuit as set forth in claim 24 wherein said transferring means includes a third FIFO, said third FIFO operable for temporarily storing a plurality of sequentially processed data spans.

27. The circuit as set forth in claim 16 or 24 wherein said system is implemented within a communications network.

28. The system as set forth in claim 16 or 24 wherein said system is implemented within a computer, each one of said data streams representative of either data received from an application running within said computer, or data received from an external source.

29. A method of controlling movement of a plurality of spans of data among a plurality of processing units thereby simultaneously processing said spans, each span representative of a segment of one of a plurality of received data streams, wherein at least one of said data streams must maintain an uninterrupted transmission, said method comprising the steps of:
   sequencing movement of ones of said spans between said processing units, wherein one of said processing units is a memory controller and wherein said sequencing step further comprising the steps of:
      receiving sequenced ones of said spans by said memory controller; and
      controlling storage of said sequenced spans in a memory storage device; and
   selectively altering a sequenced movement of particular ones of said spans as a function of either processor availability during processing of said data streams or maintenance of said uninterrupted transmission of said data streams; and
   wherein two of said data streams are asynchronous with respect to one another.

30. The method as set forth in claim 29 wherein said uninterrupted transmission data stream is real-time.

31. The method as set forth in claim 29 wherein said processing units further comprise a processor for processing a video data stream, a processor for processing a graphics data stream, and an ALU for performing logical operations on said received spans and for executing arithmetic operations on said received spans.

32. The method as set forth in claim 29 wherein said memory storage device is a RAM.

33. The method as set forth in claim 29 further comprising the step of:

retrieving particular ones said stored spans from said memory storage device by said memory controller.

34. The method as set forth in claim 29 wherein one of said processing units is an input processing unit, said input processing unit operable for receiving ones of said data streams.

35. The method as set forth in claim 29 wherein one of said processing units is an output processing unit, said output processing unit operable for driving ones of said spans.

36. The method as set forth in claim 29 wherein said sequencing step utilizes an instruction cache, said method further comprising the step of: loading said instruction cache with a plurality of instructions, each instruction operable to move a span from a first processor to a second processor.

37. The method as set forth in claim 36 wherein said loading step utilizes a plurality of linked associated instruction lists, said method further comprising the step of:

linking associated instructions together such that a current associated instruction points to a next associated instruction.

38. The method as set forth in claim 37 wherein said linking step further comprises the step of:

forward chaining through ones of said linked associated instruction lists.

39. The method as set forth in claim 37 wherein said sequencing step utilizes a master sequencer control register, said method further comprising the step of:

maintaining a unique pointer to each one of a plurality of said linked associated instruction lists.

40. The method as set forth in claim 39 wherein said selectively altering step utilizes a span sequencer control unit, said method further comprising the step of:

switching particular ones of said links of said associated instructions as a function of said second processor's availability.

41. The method as set forth in claim 39 wherein said selectively altering step utilizes a span sequencer control unit, said method further comprising the step of:

exchanging a first unique pointer with a second unique pointer as a function of maintenance of said uninterrupted transmission.

42. A method of controlling movement of a plurality of spans of data among a plurality of processing units thereby simultaneously processing said spans, each span representative of a segment of one of a plurality of received data streams, wherein at least one of said data streams must maintain an uninterrupted transmission, said method comprising the steps of:

sequencing movement of ones of said spans between said processing units, wherein one of said processing units is an ALU, said ALU operable for receiving one of said spans, for processing said received span and for transferring said processed span, and wherein one of said processing units is a memory controller, said memory controller operable for receiving sequenced ones of said spans, and controlling storage of said sequenced spans in a memory storage device; and selectively altering a sequenced movement of particular ones of said spans as a function of either processor availability during processing of said data streams or maintenance of said uninterrupted transmission of said data streams.

43. A system for phase processing two received real-time data streams wherein each received real-time data stream is partitioned into a plurality of unique spans of data, said system including at least two processing units and means for scheduling movement of ones of said spans of data among said processing units, said system comprising:

a control circuit, coupled to said processing units, for sequencing movement of ones of said spans of data among said processing units, and operable to selectively alter a sequenced movement of particular ones of said spans of data as a function of either processor availability or ensuring an uninterrupted transmission of said received real-time data streams, wherein said real-time data streams are asynchronous with respect to one another; and wherein said control circuit is for performing a first operation upon a first span of data during a first phase time and for performing a second operation upon a second span of data during a second phase time; and wherein said selectively altered sequenced movement is accomplished by alternating among spans of data associated with particular phase times; said control circuit comprising:

means for loading an instruction cache with a plurality of instructions, each instruction operable to move a span of data from a first processor to a second processor, said loading means utilizing a plurality of linked associated instruction lists;

means for linking associated instructions together such that a current associated instruction points to a next associated instruction, said linking means further comprising:

means for forward chaining through ones of said linked associated instruction lists; and a master sequencer control register, said master sequencer control register comprising means for maintaining a unique pointer to each one of a plurality of said linked associated instruction lists.

44. The system as set forth in claim 43 wherein said selectively altered movement utilizes a span sequencer control unit, said control circuit further including:

means controlled by said span sequencer control unit for switching particular ones of said links of said associated instructions as a function of said second processor's availability.

45. The system as set forth in claim 43 wherein said selectively altered movement utilizes a span sequencer control unit, said control circuit further including:

means controlled by said span sequencer control unit for exchanging a first unique pointer with a second unique pointer as a function of maintenance of said uninterrupted transmission.

46. The system as set forth in claim 43 wherein said system is implemented within a television.

47. The system as set forth in claim 43 wherein said system is implemented within a communications network.

48. A method for controlling movement of the plurality of data spans among a plurality of processing units thereby simultaneously processing ones of said data spans, each data span representative of a segment of one of a plurality of data streams, wherein at least one of said data streams must maintain an uninterrupted transmission, said method comprising the steps of:

receiving said plurality of data streams;

partitioning each of said data streams into a plurality of data spans;

sequencing movement of ones of said data spans among said processing units, wherein one of said processing units is a memory controller, said memory controller capable of receiving sequenced movements of particular ones of said data spans, for controlling storage of said sequenced data spans in a single memory storage device;

selectively altering said sequenced movements of particular ones of said data spans as a function of either processor availability during processing of said data streams or maintenance of said uninterrupted transmission of said data streams; and unifying particular ones of said data spans to create a desired output format of particular ones of said data streams.

49. The method as set forth in claim 48 wherein said sequencing step utilizes an instruction cache, said method further comprising the step of:

loading said instruction cache with a plurality of instructions, each instruction operable to moving data span from a first processor to a second processor.

50. The method as set forth in claim 49 wherein said loading step utilizes a plurality of linked associated instruction lists, said method further comprising the step of:

linking associated instructions together such that a current associated instruction points to a next associated instruction.

51. The method as set forth in claim 50 wherein said linking step further comprises a step of:

forward chaining through ones of said linked associated instruction lists.

52. The method as set forth in claim 50 wherein said sequencing step utilizes a master sequence control register said method further comprising the step of:

maintaining a unique pointer to each one of a plurality of said linked associated instruction lists.

53. The method as set forth in claim 52 wherein said selectively altering step utilizes a span sequencer control unit, said method further comprising the step of:

switching particular ones of said links of said associated instructions as a function of a particular processor's availability.

54. The method as set forth in claim 52 wherein said selectively altering step utilizes a span sequencer control unit, said method further comprising the step of:

exchanging a first unique pointer with a second unique pointer as a function of maintenance of said uninterrupted transmission.

55. The method of claim 48 wherein at least one of said processing units is a video processor for processing video data streams, and wherein at least one of said processing units is a graphics processor for processing graphics data streams.

56. A method for controlling movement of the plurality of data spans among a plurality of processing units thereby simultaneously processing ones of said data spans, each data span representative of a segment of one of a plurality of data streams, wherein at least one of said data streams must maintain an uninterrupted transmission, said method comprising the steps of:

receiving said plurality of data streams;

partitioning each of said data streams into a plurality of data spans;

sequencing movement of ones of said data spans among said processing units, wherein said processing units comprise a memory controller, said memory controller capable of receiving sequenced movements of particular ones of said data spans, for controlling storage of said sequenced data spans in a single memory storage device, a processor for processing a video data stream, a processor for processing a graphics data stream, and an ALU for performing logical operations on said received spans and for executing arithmetic operations on said received spans;

selectively altering said sequenced movements of particular ones of said data spans as a function of either processor availability during processing of said data streams or maintenance of said uninterrupted transmission of said data spans; and unifying particular ones of said data spans to create a desired output format of particular ones of said data streams.

57. An integrated circuit for processing a plurality of data streams, wherein each of said data streams is partitioned into a plurality of spans, said system comprising:

a plurality of signal processors, wherein at least one of said signal processors is a memory controller, said memory controller including means for controlling transmission of ones of said spans among a memory storage device and ones of said processing units; and a sequencing circuit coupled to said processing units, said sequencing circuit responsible for scheduling movement of ones of said spans among said processing units, said sequencing circuit operable to selectively alter a scheduled movement of particular ones of said spans as a function of either processor availability during operation of said integrated circuit or maintenance of uninterrupted movement of said data streams; and wherein two or more of said data streams are asynchronous with respect to one another.

58. The circuit of claim 57 wherein said data streams comprise video data and wherein said signal processors modify said video data.

59. The circuit of claim 58 wherein said signal processors perform functions selected from the group consisting of:

data format conversion;

color space conversion;

data tagging;

graphics mixing;

video mixing;

video scaling; and window clipping.

60. The circuit of claim 59 wherein each of said signal processors has a different function.

61. The circuit of claim 57 wherein said signal processors are operable to receive video data input and to output modified video data.

62. The circuit of claim 57 wherein said signal processors are operable to receive graphics data input and to output modified graphics data.

63. A circuit constructed on a single substrate having a plurality of processing units for controlling movement of a plurality of data spans among said processing units, each data span representative of a segment of one of a plurality of data streams, wherein at least one of said data streams must maintain an uninterrupted transmission, said circuit comprising:

means for sequencing movement of ones of said data spans among said processing units, wherein one of said processing units is a memory controller, said memory controller including means for controlling transmission of ones of said data spans among a memory storage device and ones of said processing units; and means for selectively altering a sequenced movement of particular ones of said data spans as a function of either processor availability during operation of said circuit or completion of all required processing of said data spans by said processing units without creating a delay in a particular associated data stream;

wherein two or more of said data streams are asynchronous with respect to one another.

* * * * *